US005751076A

United States Patent [19]

Zhou

[11] Patent Number: 5,751,076

[45] Date of Patent: May 12, 1998

[54] DRIVE SYSTEM FOR LIFTS

[75] Inventor: Tian Zhou, Littau, Switzerland

[73] Assignee: Inventio AG, Hergiswil, Switzerland

[21] Appl. No.: 779,224

[22] Filed: Jan. 6, 1997

[30] Foreign Application Priority Data

Dec. 19, 1996 [CH] Switzerland .......................... 00143/96

[51] Int. Cl.[6] .............................. H02K 41/00; B66B 11/04

[52] U.S. Cl. .............................................. 310/12; 187/250

[58] Field of Search .................................. 310/12, 13, 14; 187/250, 251

[56] References Cited

U.S. PATENT DOCUMENTS 5,117,136 5/1992 Kobayashi et al. ........................ 310/12
5,141,082 8/1992 Ishii et al. ............................... 187/110
5,158,156 10/1992 Okuma et al. ............................ 187/17
5,203,432 4/1993 Grinaski .................................... 187/94
5,299,662 4/1994 Reddy et al. ............................. 187/94

FOREIGN PATENT DOCUMENTS 599331 6/1994 European Pat. Off. .
1359951 4/1963 France .
2258215 2/1993 United Kingdom .

*Primary Examiner*—Steven L. Stephan
*Assistant Examiner*—Judson H. Jones
*Attorney, Agent, or Firm*—Schweitzer Cornman Gross & Bondell LLP

[57] ABSTRACT

A drive system for lifts uses a single-sided flat permanent magnet linear synchronous motor. A secondary element equipped with permanent magnets is located along the shaft and a primary element provided with coils is mounted to the cage. The primary element moves with the cage along the secondary element arranged along the shaft. The secondary element also serves as guide element for the primary element. Bearings mounted to the primary element maintain a constant air gap between the secondary element and the primary elements. With this compact drive system, the needed energy demand of the weight of the drive can be kept small. In addition, the dimensions of the lift shaft can be reduced to a minimum by the resulting compact mode of construction of the drive particularly when strong permanent magnets are used.

8 Claims, 2 Drawing Sheets

DRIVE SYSTEM FOR LIFTS

The invention concerns a drive system with a single-sided linear motor for a lift.

BACKGROUND OF THE INVENTION

A conventional drive system for lifts or elevators, in which the cage and a counterweight are connected together by means of ropes over deflection pulleys and are guided in the lift shaft by several guide rail pairs, has become known by EP 599 331. The drive, in the form of a flat linear induction motor (FLIM), is mounted at the counterweight. The primary motor elements, including the coils, are accommodated in the counterweight. A back iron, which is coated with a conductive material and is fastened at the upper and lower shaft end, serves as the secondary motor part. The secondary part is so arranged that it extends centrally through the counterweight.

Such a drive system requires an appreciable mechanical effort and a relatively great space requirement in the shaft by reason of the cable guide and counterweight. The flat linear induction motor permits only relatively low speeds of travel and operates with a low efficiency. Moreover, large and expensive frequency converters must be placed in the machine room.

A lift with a linear motor drive, in which the cage is driven without ropes by means of a double-sided linear permanent magnet synchronous motor (PM-SLIM), has become known by DE 41 15 728. The secondary elements, provided with permanent magnets or electromagnets, are mounted by a pair of bearer parts which are of wing shape and arranged at the right-hand and left-hand side walls of the lift cage. The secondary elements are subdivided into four parts. Several primary side coils, which are likewise subdivided into four parts, are mounted along the entire shaft. The drive is fed by means of a variable frequency converter.

This solution needs relatively high electrical power for the operation of the linear motor. The arrangement of the primary and secondary elements requires significant technical effort to maintain a constant air gap. Moreover, such a linear motor arrangement is of relatively expensive construction by reason of the arrangement of the primary and secondary elements at both sides and the weight of the cage which is increased unnecessarily by the mounting of the numerous permanent magnets or electromagnets. Safety factors, for example to attend to a current failure, are realizable only with increased technical effort because of the type of drive employed.

The object of the present invention is accordingly to provide an improved drive system for lifts of the initially mentioned type, which improved system does not display the disadvantages of the prior art and is characterized by a simple mechanical construction.

BRIEF DESCRIPTION OF THE INVENTION

The advantages achieved by the present invention include reduced energy demand and drive weight, resulting from the use of a direct drive in the form of a compact flat permanent magnet linear synchronous motor (PM-FLSM) as the lift drive. Compared with flat linear induction motor (FLIM) elevators, no counterweight is required by a single-sided motor elevator. Moreover, the dimensions of the lift shaft can be reduced to a minimum by the compact mode of construction of the drive, and in particular by the use of strong permanent magnets.

In comparison with a double-sided linear permanent magnet synchronous motor, it is easier for the invention to be installed and maintained. The single-sided flat permanent magnet linear synchronous motor elevator of the present invention also has much fewer problems which would otherwise result from an inconsistent air gap between the primary element and the secondary elements. For the maintenance of a constant air gap, the movable motor part of the permanent magnet linear synchronous motor of the present invention is guided directly by the cage bearings.

BRIEF DESCRIPTION OF THE DRAWINGS

An example of an illustrative embodiment of the invention is set forth in the following description and in the annexed drawings, wherein.

DETAILED DESCRIPTION OF THE INVENTION

Figure 1:
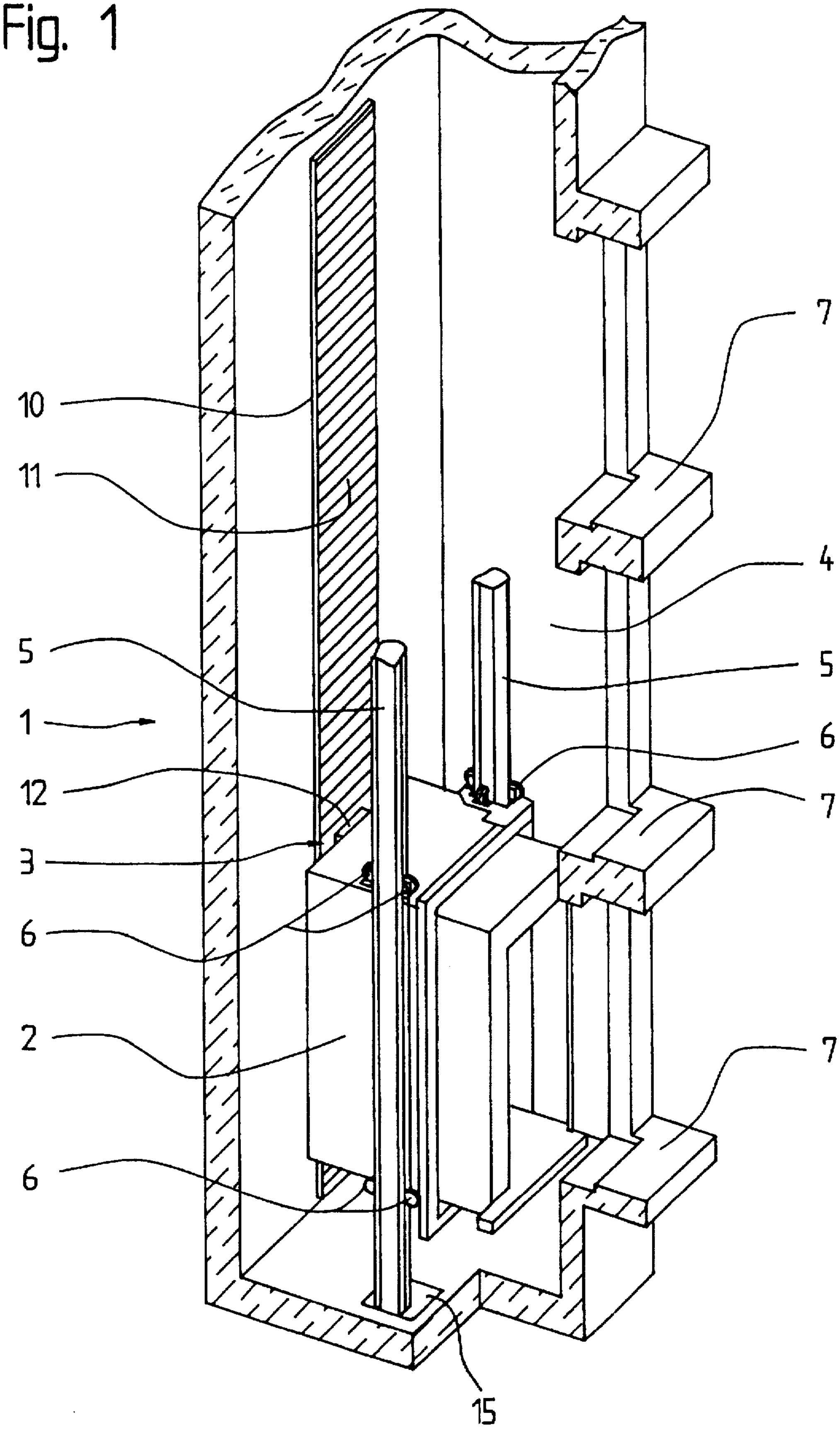
FIG. 1 is a schematic illustration of a lift installation with a cage in accordance with the present invention having a single-sided flat permanent magnet linear synchronous motor drive.

FIG. 1 shows a lift installation 1 with a cage 2 with a flat permanent magnet linear synchronous motor drive 3. The main features of this lift installation 1 are a compact and light drive structure as well as the absence of a conventional machine room and counterweight by reason of the use of the permanent magnet linear synchronous motor direct drive 3. The cage 2 is guided by means of guide rollers 6 at guide rails 5 in a shaft 4 and serves several stories 7. The guide rails are supported by footplates 15.

The cage 2 is driven by a single-sided flat permanent magnet linear synchronous motor 3 (PM-FLSM). A secondary motor element 10 of the linear motor 3 is equipped with permanent magnets 11 and is fastened to one side or wall of the shaft 4. A primary motor element 12, equipped with coils, is mounted upon an outer side of the cage 2.

The single-sided flat permanent magnet linear synchronous motor 3 is brushless, and preferably of two phase construction in two phases which has the consequence of a reduction in the magnetic coupling between the motor phases. By the use of strong permanent magnets 11, such as, for example, rare earth magnets and in particular neodymium, the efficiency of the permanent magnet linear synchronous motor 3 may be increased and the motor volume is reduced still further, which leads to a compact motor structure. The primary element 12 of the linear synchronous motor 3 moves together with the cage 2 along the secondary element 10 arranged along the shaft 4. The secondary element 10 also serves as a guide element for the primary element 12. Bearings located at the primary element 12 maintain a constant air gap L between the primary element 12 and the secondary element 10.

In an alternative embodiment, the secondary element 10, equipped with the permanent magnets 11, can be mounted to the cage 2 and the primary element 12 mounted upon the shaft 4. In addition, the drive can be configured as a three-phase flat permanent magnet linear synchronous motor 3.

In comparison with a flat or tubular linear induction motor, the output power per unit of volume for flat permanent magnet linear synchronous motor 3 is substantially greater by reason of an increased usable flux. The weight of the permanent magnet linear synchronous motor 3 can be additionally reduced by the use of strong permanent magnets 11; efficiency is increased by the reduction in Joule heat losses. By reason of these savings, the energy consumption of the permanent magnet linear synchronous motor 3 is appreciably smaller in comparison to conventional linear motor drives.

Figure 2:
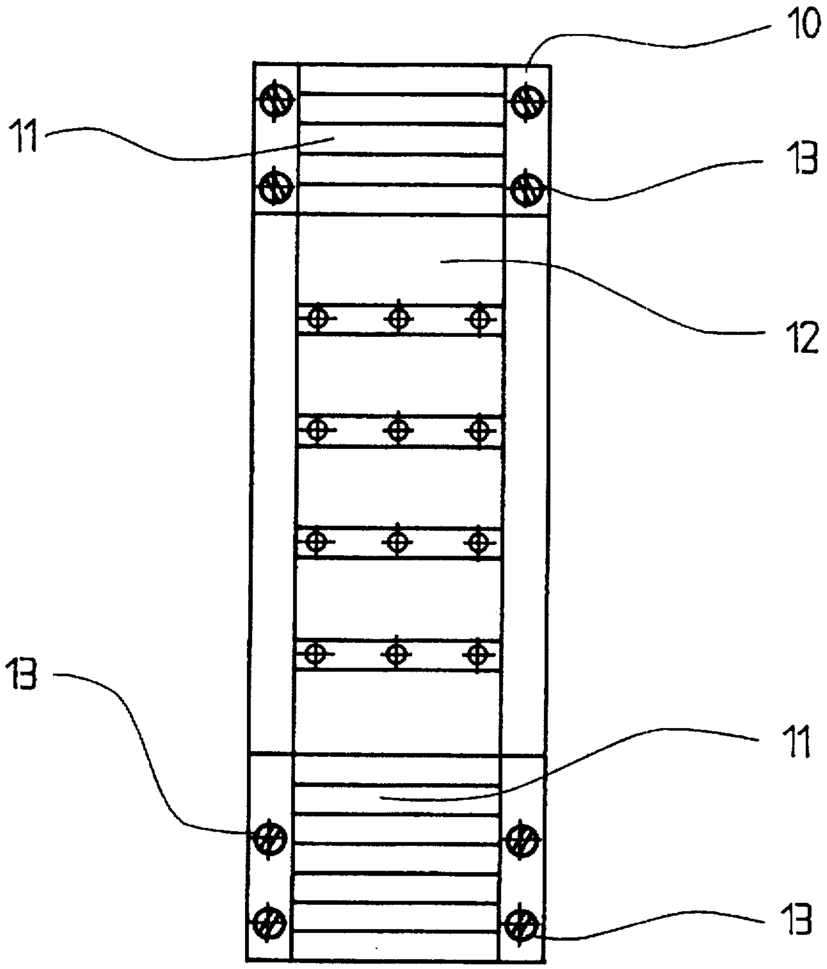
FIG. 2 is an elevation view of a single-sided flat permanent magnet linear synchronous motor utilized in the invention.
Figure 3:
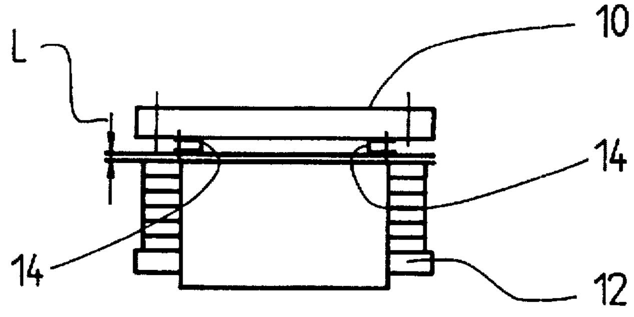
FIG. 3 is a cross-section through the single-sided flat permanent magnet linear synchronous motor of FIG. 2.

FIGS. 2 and 3, respectively, show an elevation and a cross-section of the flat permanent magnet linear synchronous motor 3. The secondary element 10, with the permanent magnets 11, which is behind primary element 12 in FIG. 2, is connected to the shaft 4 by means of fastening elements 13 located at several points along the length of the secondary element. Bearings 14, which are located at the primary element as seen in FIG. 3 and are likewise directly connected to the cage, maintain a constant air gap L between the primary element 12 and the secondary element 10.

The flat permanent magnet linear synchronous motor 3 has a control system which may include a pulse width modulator (PWM) with a 16-bit single-chip microprocessor and an H-bridge with eight IGBT/MOSFETs for the drive as known in the art. The permanent magnet linear synchronous drive 3 may be provided with a frequency-controlled converter, which in a generator operation mode of the permanent magnet linear synchronous motor 3 can feed energy back into the mains. Regeneration to the mains may be particularly advantageous in the case of high-speed lifts in high buildings.

Hall effect sensors, which supply position signals in the form of sine and cosine oscillations to the lift control, may be located on the primary element 12 of the permanent magnet linear synchronous motor 3. Together with the frequency-variable drive and the control system, positional determinations based upon linear incremental measurements can achieve a very high measurement accuracy, typically ±0.5 millimeters. After a drive current failure, an initialization phase can supply exact absolute positioning signals.

Sinusoidal commutation in conjunction with the absolute position signals supplied by the initialization phase permit the production of a smooth, jerk-free driving force with minimum force peaks for the flat permanent magnet linear synchronous motor 3.

In case of a sudden current failure of the permanent magnet linear synchronous motor 3, the coils of the primary element 12 can be placed into a short-circuit setting to operate as a dynamic brake. The braking force produced in the short-circuit windings of the permanent magnet linear synchronous motor 3 operating as a generator limits the lowering speed of the fully loaded cage 2. For example, for a percentage impedance of the primary coils of 5%, the lowering speed of the cage 2 should not exceed 5% of the nominal cage speed. In the case of a nominal cage speed of 6 meters per second, this value would be limited to 0.3 meters per second, subject to the dimensioning of the coils of the primary element 12. This arrangement has the advantage that the cage 2 in the case of a current failure can be driven automatically to the lowermost story without use of an additional emergency current supply, such as a battery bank.

A conventional brake (for example a belt or drum brake) can be used to stop the cage 2 in normal operation. Here, too, the possibility exists of replacing such conventional brake by short narrow linear motors, whereby a still more compact structure of the lift installation 1 can be achieved.

A lift installation 1 described above with the flat permanent magnet linear synchronous motor 3 will furthermore typically contain the safety equipment (catching device, excess speed detector, limit switches, and so forth) usual in lift installations 1.

I claim:

1. A linear motor drive system for a lift installation, for which a cage is guided by guide rails in a shaft and driven directly by the linear motor, characterized in that the linear motor is constructed as a single-sided flat linear synchronous motor with permanent magnets and that bearing means are provided to insure a constant air gap between a primary and a secondary element of the linear motor.

2. The drive system according to claim 1, wherein the linear synchronous motor comprises a secondary element mechanically connected to the cage and a primary element mechanically connected to the shaft.

3. The drive system according to claim 1, wherein the linear synchronous motor comprises a secondary element mechanically connected to the shaft and a primary element mechanically connected to the cage.

4. A drive system according to one of claims 1 to 3, wherein the secondary element comprises neodymium rare earth permanent magnets.

5. A drive system according to one of claims 1 to 3, wherein the linear synchronous motor includes a pulse width modulator with a microprocessor and an H-bridge with IGBT/MOSFETs for a frequency-variable drive.

6. A drive system according to one of claims 1 to 3 further comprising Hall effect sensors arranged on the secondary element of the permanent magnet linear synchronous motor.

7. A drive system according to one of claims 1–3, wherein the guide rails are supported on the ground by footplates.

8. A drive system according to one of claims 1–3, wherein the guide rails are self-supporting along their lengths.

* * * * *